United States Patent
Boltze et al.

(10) Patent No.: US 7,318,846 B2
(45) Date of Patent: Jan. 15, 2008

(54) MIXTURE FORMATION MEANS FOR A REFORMER OF A FUEL CELL SYSTEM OR FOR A HEATER

(75) Inventors: Matthias Boltze, Neubrandenburg (DE); Christian Wunderlich, Chemnitz (DE); Matthias Jahn, Neubrandenburg (DE)

(73) Assignee: Enerday GmbH, Stockdorf (DE)

( * ) Notice: Subject to any disclaimer, the term of this patent is extended or adjusted under 35 U.S.C. 154(b) by 58 days.

(21) Appl. No.: 10/667,408

(22) Filed: Sep. 23, 2003

(65) Prior Publication Data
US 2004/0086436 A1 May 6, 2004

(30) Foreign Application Priority Data
Oct. 31, 2002 (DE) ................. 102 50 882

(51) Int. Cl.
*B01J 7/00* (2006.01)
*G01M 19/00* (2006.01)
*F02M 37/00* (2006.01)

(52) U.S. Cl. .................. 48/61; 48/180.1; 48/186; 48/189.2; 48/189.3; 48/191; 73/118.1; 123/510; 123/511; 123/514; 123/515

(58) Field of Classification Search ......... 48/180.1, 48/186, 190, 191, 189.2–189.4; 73/118.1; 123/510, 511, 514, 515
See application file for complete search history.

(56) References Cited

U.S. PATENT DOCUMENTS 5,425,342 A * 6/1995 Ariga et al. ............. 123/456
5,540,206 A    7/1996 Heimberg

FOREIGN PATENT DOCUMENTS

| DE | 41 06 015 A1 | 8/1992 |
| DE | 42 05 212 | 8/1993 |
| JP | 60-178939 | 9/1985 |
| WO | WO 00/06948 | 2/2000 |

* cited by examiner

*Primary Examiner*—Glenn Caldarola
*Assistant Examiner*—Kaity Handal
(74) *Attorney, Agent, or Firm*—David S. Safran

(57) ABSTRACT

A mixture formation means for the reformer of a fuel cell system or for a heater. The fuel feed includes a pressure impulse injection means and the mixture formation area is a swirl chamber having a discharge nozzle connected to the pressure impulse injection device. Also included is a fuel heater for preheating the fuel before injection in order to achieve complete vaporization of the fuel, such as diesel fuel.

5 Claims, 1 Drawing Sheet

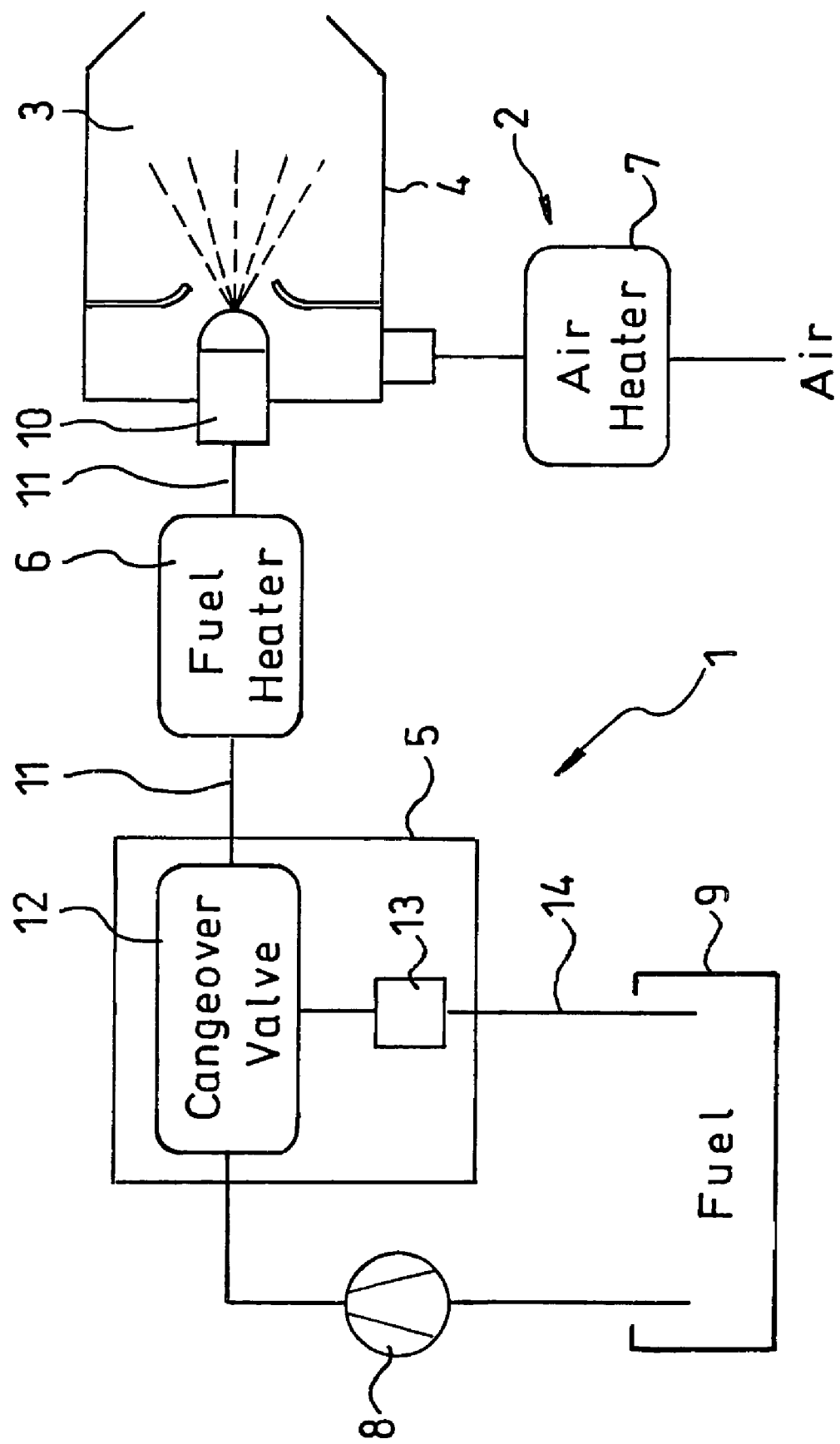

MIXTURE FORMATION MEANS FOR A REFORMER OF A FUEL CELL SYSTEM OR FOR A HEATER

BACKGROUND OF THE INVENTION

1. Field of the Invention

The invention relates to a mixture formation means for the reformer of a fuel cell system or for a heater with fuel feed, air feed and a mixture formation area.

2. Description of Related Art

Mixture formation means are always used when there must be mixing of the liquid or gas involved in the reaction before entering the reaction space. In particular, it is possible to set a defined mixing ratio. Another important task of mixture formation prior to entering the reaction space is to form an especially homogeneous mixture.

Fuel cell systems, particularly those for operation with liquid fuels such as gasoline or diesel fuel, require a reforming unit which converts a mixture of air and fuel vapor into a hydrogen-rich reformat with which the fuel cell is operated. Production of a homogeneous mixture of air and fuel vapor is a particular problem for diesel fuel due to the relatively high temperatures required for complete vaporization. The temperature for complete vaporization of diesel fuel is roughly 400° C. Conventional vaporization techniques often fail due to carbonization and inhomogenous mixture.

International Patent Application Publication WO 00/06948, the U.S. national phase of which is now U.S. Pat. No. 6,793,693 B1, discloses mixture formation using the "cold flame" principle. However, mixture formation devices which function using this principle are relatively large and are difficult to adjust in the load range. Conventional injection processes such as continuously operating pressure atomizers require permanently high injection pressures and therefore cannot be modulated over the required load range.

Economical injection systems for internal combustion engines are known in the form of pressure impulse injection means, for example, from published German Patent Application DE 41 06 015 A1 and its counterpart U.S. Pat. No. 5,540,206. These pressure impulse injection means are only moderately suited for use in reformers for fuel cell systems or for use in a heater since complete diesel vaporization and homogenous mixture formation cannot be accomplished.

SUMMARY OF THE INVENTION

The object of the invention is to provide a mixture formation means which forms a very homogenous mixture without the occurrence of carbonization. Additionally, the mixture formation means shall be small and economical to build.

Another objective is to provide a mixture formation means which can be well modulated over a wide load range.

The objects of the invention are achieved by modifying a mixture formation means of the conventional type so that fuel feed is constructed as a pressure impulse injection means, the mixture formation area is formed by a swirl chamber into which a nozzle connected to the pressure impulse injection device discharges, and the fuel is preheated before injection by a fuel heating means.

This combination of a pressure impulse injection device with heating and a swirl chamber entails several advantages. As a result of the high injection pressures, which are possible due to the pressure impulse injection means, excellent atomization of the fuel takes place. An additional atomization effect occurs by spontaneous fuel vaporization at the nozzle outlet which occurs because the fuel already has a high temperature due to preheating.

Compared to continuously operating pressure atomizers, the modulation capacity of the system is much better. With the mixture formation means of the invention modulation in the range from 20 to 100% can be easily and economically achieved.

Fuel heating is especially advantageous in the area of the fuel line between the changeover valve of the pressure impulse injection device and the nozzle. In this arrangement, the changeover valve is not exposed to high temperatures and, as a result, can be designed to be less complex and more economical.

With the mixture formation means of the invention, the fuel is heated advantageously to such an extent that the vapor pressure of the fuel is below the holding pressure of the pressure impulse injection means.

In one especially advantageous embodiment of the mixture formation means of the invention, the air feed has an air heating means. Preheating of the air results in condensation of the fuel-air mixture in the swirl chamber being avoided. In addition, complete evaporation and homogeneous mixing of the fuel with the air occurs.

The invention is explained in detail below using one embodiment and the accompanying drawings.

BRIEF DESCRIPTION OF THE DRAWING

The sole figure is a schematic of the mixture formation means of the invention for a reformer of a fuel cell system or for a heater, and, in particular, an auxiliary heater for motor vehicles.

DETAILED DESCRIPTION OF THE INVENTION

The illustrated mixture formation means has a fuel feed 1, an air feed 2 and mixture formation area 3. The fuel feed is formed by a pressure impulse injection means 5. The latter is supplied with fuel from a fuel tank 9 via a pump 8. In the pressure impulse injection means 5 there is a changeover valve 12 which can deliver the required fuel either via a return line 14 in which there is a pressure holding valve 13 into the fuel tank 9, or feeds the required fuel via a fuel line 11 to a nozzle 10 which injects the fuel into a swirl chamber 4 which forms the mixture formation 3. The pressure produced by the pump 8 is matched to the holding pressure of the pressure holding valve 13. The changeover valve 12 is however triggered via an electronic control (not shown), clocked according to the load, the return line 14 being closed suddenly and the pressure impulse which is building up leading to opening of the injection nozzle and thus to injection.

In order to achieve good mixture formation for diesel as the fuel, in the fuel line 11 between the changeover valve 12 and the nozzle 10 there is fuel heating means 6 which heats the fuel up to the temperature at which the vapor pressure is still below the holding pressure of the system, this holding pressure being determined by the pressure holding valve 13.

Air is supplied via the air heating means 7, the air being continuously supplied. The air then tangentially enters the swirl chamber where it is homogeneously swirled and mixed with the injected fuel. The temperature of air preheating is preferably high enough to prevent condensation of the fuel in the swirl chamber 4.

The described mixture formation means is suited both for reformers of fuel cell systems and also for heaters, particularly for motor vehicles. Reformers and heaters share the feature that a fuel and an oxidizer, e.g., air, react with one another in a reaction chamber. While a hydrogen-containing gas is formed in a reformer, the reaction parameters are set in a heater such that combustion occurs and the heat needed for heating is released. Both in the reforming reaction in the reformer and also in combustion in the heater it is necessary for good reaction of the supplied substances that the mixture is optimized. Sub-optimum mixing adversely effects fuel consumption, increases the emission of pollutants, and also raises questions regarding the suitability of a resulting reformat for combustion in a fuel cell.

What is claimed is:

1. A fuel cell apparatus with a reformer and a mixture formation means for mixing fluids prior to entering a reaction space, said mixture formation means comprising:

a mixture formation area including a swirl chamber;

an air feed means for supplying air to the mixture formation area;

a fuel line including a fuel heating means for heating fuel in the fuel line and a nozzle having an outlet and being connected to the mixture formation area to supply heated fuel from the fuel line to the swirl chamber, wherein the fuel heating means preheats the fuel to a temperature that produces spontaneous fuel vaporization at the outlet of the nozzle; and a fuel feed means connected to a fuel source for feeding fuel between the fuel source and the fuel line, wherein the fuel feed means includes a supply line, a return line, and a pressure impulse injection means for selectively supplying fuel from the supply line to either the fuel line or the return line, wherein the supply line includes a fuel pump having a pumping pressure, and the return line includes a pressure holding valve having a holding pressure, wherein the pumping pressure is matched to the holding pressure, and wherein the pressure impulse injection means includes a changeover valve having an input side connected to the fuel pump and an output side that is selectively connectable with the fuel source via the return line and the mixture formation area via the fuel line such that the changeover valve directs fuel from the fuel pump to either the fuel line or the fuel source.

2. The fuel cell apparatus as claimed in claim 1, wherein the fuel heating means is adapted to heat the fuel to the temperature at which the vapor pressure of the fuel is below a holding pressure determined by the pressure holding valve.

3. The fuel cell apparatus as claimed in claim 1, wherein the air feed means includes an air heater.

4. The fuel cell apparatus as claimed in claim 3, wherein the air heater is adapted to heat the air to a temperature at which condensation of the fuel in the swirl chamber does not occur.

5. The fuel cell apparatus as claimed in claim 1, wherein the air feed is adapted to supply air continuously.

* * * * *